(12) United States Patent
Caren

(10) Patent No.: US 10,968,886 B2
(45) Date of Patent: Apr. 6, 2021

(54) AIRFOIL AND A TURBINE APPARATUS

(71) Applicant: Caren Meicnic Teoranta, Shankill (IE)

(72) Inventor: Colm Joseph Caren, Shankill (IE)

(73) Assignee: Caren Meicnic Teoranta, Dublin (IE)

( * ) Notice: Subject to any disclaimer, the term of this patent is extended or adjusted under 35 U.S.C. 154(b) by 0 days.

(21) Appl. No.: 16/346,870

(22) PCT Filed: Oct. 25, 2017

(86) PCT No.: PCT/EP2017/077272
§ 371 (c)(1),
(2) Date: May 1, 2019

(87) PCT Pub. No.: WO2018/082983
PCT Pub. Date: May 11, 2018

(65) Prior Publication Data
US 2019/0257288 A1   Aug. 22, 2019

(30) Foreign Application Priority Data

Nov. 2, 2016  (EP) .................................... 16196917

(51) Int. Cl.
*F03D 1/06* (2006.01)
*F03D 5/00* (2006.01)
(Continued)

(52) U.S. Cl.
CPC ............ *F03D 5/00* (2013.01); *F03D 1/0633* (2013.01); *F03D 3/061* (2013.01); *F03D 80/00* (2016.05);
(Continued)

(58) Field of Classification Search
CPC .......... F03D 5/00; F03D 80/00; F03D 1/0633; F03D 3/061; F05B 2240/301;
(Continued)

(56) References Cited

U.S. PATENT DOCUMENTS

2007/0224029 A1* 9/2007 Yokoi .................... F03D 3/005
415/4.2

FOREIGN PATENT DOCUMENTS

CN    101 598 105    12/2009
DE    41 34 062      4/1992
(Continued)

*Primary Examiner* — Christopher Verdier
*Assistant Examiner* — Sabbir Hasan
(74) *Attorney, Agent, or Firm* — LaMorte & Associates P.C.

(57) ABSTRACT

The present invention provides a turbine airfoil for relative movement in an ambient fluid, and a turbine apparatus comprising at least one airfoil. The airfoil comprises a main spar having two hill formations and discharge means operable to discharge evaporative and condensing fluids outwardly into the ambient fluid flowing over the main spar. The first of these hill formations accelerates the flow of the ambient fluid until it reaches the speed of sound. After the first hill formation the Mach number continues to increase and the evaporative fluid is discharged into the ambient causing the air to cool which accelerates the ambient flow further and decreases the pressure. On the second hill formation the lower pressure causes a thrust. As the flow moves relative to the second hill formation the Mach number decreases and then increases as it descends the second region. A condensing fluid is discharged causing the water content of the air to condense releasing heat which results in a decrease in Mach number and an increase in pressure. The increased pressure on the second hill formation will produce a thrust which can be used to turn a rotor. The present invention provides an airfoil for producing work and power directly from the moisture in the air. It has no dependence on wind speed and its energy source is directly derived from the always available ambient atmosphere.

10 Claims, 14 Drawing Sheets

(51) Int. Cl.
*F03D 80/00* (2016.01)
*F03D 3/06* (2006.01)

(52) U.S. Cl.
CPC ..... *F05B 2240/301* (2013.01); *F05B 2260/20* (2013.01); *F05B 2260/212* (2013.01); *Y02E 10/74* (2013.01); *Y02T 50/60* (2013.01)

(58) Field of Classification Search
CPC ........... F05B 2260/20; F05B 2260/212; Y02E 10/74; Y02E 50/675
See application file for complete search history.

(56) References Cited

FOREIGN PATENT DOCUMENTS

| | | | |
|---|---|---|---|
| DE | 4134062 C2 * | 7/1997 | ........... F03D 1/0608 |
| DE | 19780521 | 3/1999 | |
| EP | 2 551 486 | 1/2013 | |
| WO | WO 2011/101847 | 8/2011 | |

* cited by examiner

| Relative Humidity (%) \ Temperature (C) | 0 | 2 | 4 | 6 | 8 | 10 | 12 | 14 | 16 | 18 | 20 | 22 | 24 | 26 | 28 | 30 | 32 | 34 | 36 |
|---|---|---|---|---|---|---|---|---|---|---|---|---|---|---|---|---|---|---|---|
| 3% | 1.46 | 1.47 | 1.47 | 1.48 | 1.48 | 1.49 | 1.49 | 1.49 | 1.50 | 1.50 | 1.50 | 1.51 | 1.51 | 1.52 | 1.52 | 1.52 | 1.53 | 1.53 | 1.53 |
| 6% | 1.38 | 1.38 | 1.39 | 1.39 | 1.39 | 1.40 | 1.40 | 1.40 | 1.40 | 1.41 | 1.41 | 1.41 | 1.42 | 1.42 | 1.42 | 1.42 | 1.42 | 1.43 | 1.43 |
| 9% | 1.33 | 1.33 | 1.33 | 1.34 | 1.34 | 1.34 | 1.34 | 1.34 | 1.35 | 1.35 | 1.35 | 1.35 | 1.35 | 1.36 | 1.36 | 1.36 | 1.36 | 1.36 | 1.36 |
| 12% | 1.29 | 1.29 | 1.29 | 1.29 | 1.30 | 1.30 | 1.30 | 1.30 | 1.30 | 1.30 | 1.30 | 1.31 | 1.31 | 1.31 | 1.31 | 1.31 | 1.30 | 1.30 | 1.30 |
| 15% | 1.26 | 1.26 | 1.26 | 1.26 | 1.26 | 1.26 | 1.27 | 1.27 | 1.27 | 1.27 | 1.27 | 1.27 | 1.27 | 1.27 | 1.26 | 1.26 | 1.26 | 1.26 | 1.25 |
| 18% | 1.23 | 1.23 | 1.23 | 1.23 | 1.24 | 1.24 | 1.24 | 1.24 | 1.24 | 1.23 | 1.23 | 1.23 | 1.23 | 1.23 | 1.23 | 1.23 | 1.22 | 1.22 | 1.21 |
| 21% | 1.21 | 1.21 | 1.21 | 1.21 | 1.21 | 1.21 | 1.21 | 1.21 | 1.21 | 1.21 | 1.21 | 1.20 | 1.20 | 1.20 | 1.19 | 1.19 | 1.18 | 1.18 | 1.17 |
| 24% | 1.19 | 1.19 | 1.19 | 1.19 | 1.19 | 1.19 | 1.19 | 1.19 | 1.18 | 1.18 | 1.18 | 1.18 | 1.17 | 1.17 | 1.16 | 1.16 | 1.15 | 1.14 | 1.13 |
| 27% | 1.17 | 1.17 | 1.17 | 1.17 | 1.17 | 1.17 | 1.17 | 1.16 | 1.16 | 1.16 | 1.15 | 1.15 | 1.15 | 1.14 | 1.13 | 1.12 | 1.12 | 1.11 | 1.10 |
| 30% | 1.15 | 1.15 | 1.15 | 1.15 | 1.15 | 1.15 | 1.15 | 1.14 | 1.14 | 1.14 | 1.13 | 1.13 | 1.12 | 1.11 | 1.11 | 1.10 | 1.08 | 1.07 | 1.06 |
| 33% | 1.14 | 1.14 | 1.14 | 1.14 | 1.13 | 1.13 | 1.13 | 1.12 | 1.12 | 1.11 | 1.11 | 1.10 | 1.10 | 1.09 | 1.08 | 1.07 | 1.05 | 1.04 | 1.02 |
| 36% | 1.12 | 1.12 | 1.12 | 1.12 | 1.12 | 1.11 | 1.11 | 1.11 | 1.10 | 1.10 | 1.09 | 1.08 | 1.07 | 1.06 | 1.05 | 1.03 | 1.02 | 1.00 | 0.97 |
| 39% | | 1.11 | 1.11 | 1.10 | 1.10 | 1.10 | 1.09 | 1.09 | 1.08 | 1.08 | 1.07 | 1.06 | 1.05 | 1.03 | 1.02 | 1.00 | 0.98 | 0.95 | 0.91 |
| 42% | | | | | | 1.08 | 1.08 | 1.07 | 1.06 | 1.06 | 1.05 | 1.04 | 1.02 | 1.01 | 0.99 | 0.97 | 0.94 | 0.88 | |
| 45% | | | | | | | | | | 1.04 | 1.02 | 1.01 | 1.00 | 0.98 | 0.95 | 0.92 | | | |
| 48% | | | | | | | | | | | | | | | 0.90 | | | | |
| 51% | | | | | | | | | | | | | | | | | | | |

Fig.12

Table 2 - Post condensation Mach numbers for a Caren Turbine operating with 10K of cooling

| Relative Humidity (%) \ Temperature (C) | 0 | 2 | 4 | 6 | 8 | 10 | 12 | 14 | 16 | 18 | 20 | 22 | 24 | 26 | 28 | 30 | 32 | 34 | 36 |
|---|---|---|---|---|---|---|---|---|---|---|---|---|---|---|---|---|---|---|---|
| 3% | 5.95 | 5.97 | 5.98 | 6.00 | 6.01 | 6.02 | 6.04 | 6.05 | 6.07 | 6.08 | 6.10 | 6.12 | 6.14 | 6.16 | 6.17 | 6.19 | 6.20 | 6.22 | 6.23 |
| 6% | 5.67 | 5.68 | 5.69 | 5.70 | 5.71 | 5.72 | 5.74 | 5.75 | 5.76 | 5.78 | 5.79 | 5.80 | 5.81 | 5.83 | 5.84 | 5.85 | 5.86 | 5.87 | 5.88 |
| 9% | 5.53 | 5.54 | 5.54 | 5.55 | 5.56 | 5.57 | 5.58 | 5.59 | 5.60 | 5.61 | 5.62 | 5.63 | 5.64 | 5.65 | 5.66 | 5.67 | 5.68 | 5.69 | 5.70 |
| 12% | 5.43 | 5.43 | 5.44 | 5.45 | 5.46 | 5.47 | 5.47 | 5.48 | 5.49 | 5.50 | 5.51 | 5.52 | 5.53 | 5.53 | 5.54 | 5.55 | 5.56 | 5.56 | 5.57 |
| 15% | 5.36 | 5.36 | 5.37 | 5.38 | 5.39 | 5.39 | 5.40 | 5.41 | 5.41 | 5.42 | 5.42 | 5.43 | 5.44 | 5.44 | 5.45 | 5.46 | 5.47 | 5.48 | 5.48 |
| 18% | 5.30 | 5.31 | 5.31 | 5.32 | 5.32 | 5.33 | 5.33 | 5.34 | 5.35 | 5.36 | 5.36 | 5.37 | 5.38 | 5.38 | 5.39 | 5.40 | 5.40 | 5.41 | 5.41 |
| 21% | 5.26 | 5.26 | 5.27 | 5.27 | 5.28 | 5.29 | 5.29 | 5.30 | 5.30 | 5.31 | 5.31 | 5.32 | 5.32 | 5.33 | 5.33 | 5.34 | 5.34 | 5.35 | 5.36 |
| 24% | 5.22 | 5.23 | 5.23 | 5.23 | 5.24 | 5.24 | 5.25 | 5.25 | 5.26 | 5.27 | 5.27 | 5.28 | 5.28 | 5.29 | 5.29 | 5.30 | 5.30 | 5.30 | 5.31 |
| 27% | 5.19 | 5.20 | 5.20 | 5.21 | 5.21 | 5.21 | 5.22 | 5.22 | 5.22 | 5.23 | 5.23 | 5.24 | 5.24 | 5.25 | 5.25 | 5.26 | 5.26 | 5.27 | 5.27 |
| 30% | 5.17 | 5.17 | 5.17 | 5.18 | 5.18 | 5.19 | 5.19 | 5.19 | 5.20 | 5.20 | 5.20 | 5.21 | 5.21 | 5.22 | 5.22 | 5.22 | 5.23 | 5.23 | 5.23 |
| 33% | 5.15 | 5.15 | 5.15 | 5.15 | 5.16 | 5.16 | 5.16 | 5.17 | 5.17 | 5.18 | 5.18 | 5.18 | 5.19 | 5.19 | 5.19 | 5.20 | 5.20 | 5.20 | 5.21 |
| 36% | 5.13 | 5.13 | 5.13 | 5.13 | 5.14 | 5.14 | 5.14 | 5.15 | 5.15 | 5.15 | 5.15 | 5.16 | 5.16 | 5.16 | 5.17 | 5.17 | 5.18 | 5.18 | 5.18 |
| 39% | 5.11 | 5.11 | 5.12 | 5.12 | 5.12 | 5.12 | 5.13 | 5.13 | 5.13 | 5.13 | 5.14 | 5.14 | 5.14 | 5.14 | 5.15 | 5.15 | 5.15 | 5.15 | 5.16 |
| 42% | 5.09 | 5.10 | 5.10 | 5.10 | 5.10 | 5.11 | 5.11 | 5.11 | 5.11 | 5.12 | 5.12 | 5.12 | 5.12 | 5.13 | 5.13 | 5.13 | 5.13 | 5.14 | 5.14 |
| 45% | 5.08 | 5.08 | 5.08 | 5.09 | 5.09 | 5.09 | 5.09 | 5.10 | 5.10 | 5.10 | 5.10 | 5.11 | 5.11 | 5.11 | 5.11 | 5.12 | 5.12 | 5.12 | 5.12 |
| 48% | 5.07 | 5.07 | 5.07 | 5.08 | 5.08 | 5.08 | 5.08 | 5.08 | 5.08 | 5.09 | 5.09 | 5.09 | 5.09 | 5.10 | 5.10 | 5.10 | 5.10 | 5.10 | 5.11 |
| 51% | 5.06 | 5.06 | 5.06 | 5.07 | 5.07 | 5.07 | 5.07 | 5.07 | 5.07 | 5.08 | 5.08 | 5.08 | 5.08 | 5.08 | 5.08 | 5.09 | 5.09 | 5.09 | 5.09 |

Table 3 - Depth to the central section for a Caren Turbine operating with 10K of cooling

Fig. 13

| Inlet | Throat | Dip | 2nd Throat | Outlet |
|---|---|---|---|---|
| 5.044314 cm | 5 cm | 5.934803 cm | 5.449875 cm | 6.7 cm |
Fig. 14
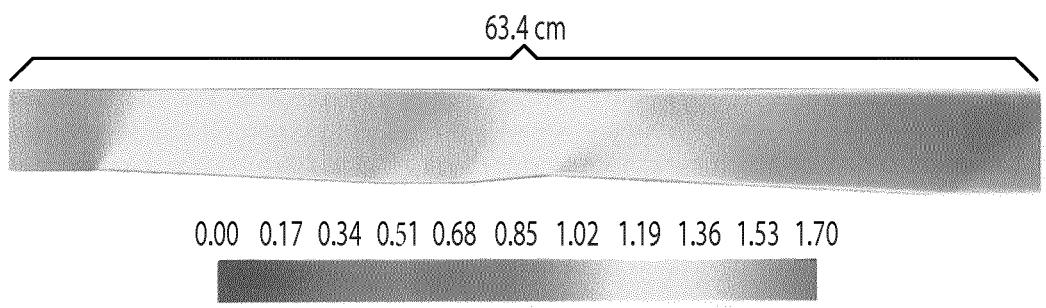
Fig. 15
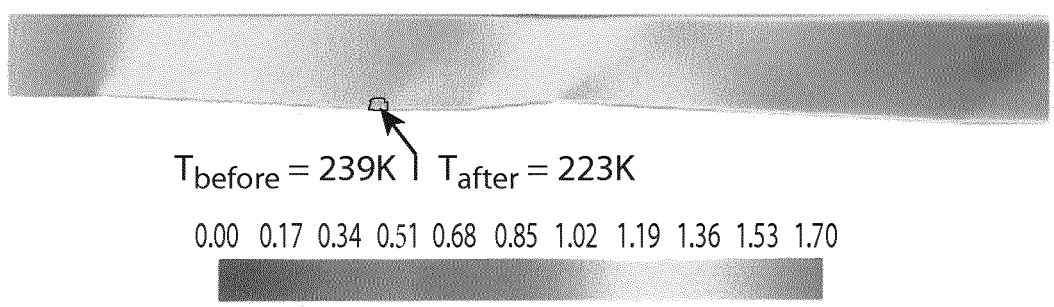
Fig. 16

$T_{before} = 244K$ | $T_{after} = 251K$ 0.00  0.17  0.34  0.51  0.68  0.85  1.02  1.19  1.36  1.53  1.70

0.00  0.17  0.34  0.51  0.68  0.85  1.02  1.19  1.36  1.53  1.70

AIRFOIL AND A TURBINE APPARATUS

The present invention relates to an airfoil for relative movement in an ambient fluid and to a turbine apparatus having an airfoil.

Apart from nuclear and tidal processes all energy on the earth can be described as deriving from the sun itself, whether directly or stored over considerable time periods. When the sun shines on the planet, the energy provokes many processes—climatic effects being the most obvious, and it is well known that life, both plant and animal is sustained by this source. Whilst the majority of the suns energy is used to heat the vast system surrounding the sun, a large proportion of the sun's energy results in evaporation of water, such as from major water bodies. This evaporation provides rainfall and maintains a vast amount of water vapour, a small proportion of which may accumulate to form condensing clouds. Conventional power sources are derived from chlorophilic and other organic processes, which use less than 1% of the suns energy.

Renewable energy windmills are known to take advantage of evaporation and condensation processes to generate work and power. The most recent developments are the Barton preheated expansion engine and the EOLA wind turbine. These machines are used to supply energy (Barton made) and water (EOLA turbine) in limited circumstances. The Barton engine requires pre heated dried air and evaporating water to extra low grade energy efficiency and is restricted to turbine exhausts or preheated dry air such as solar arrays. The EOLA is a conventional air turbine attached to a conventional air conditioning unit.

The known devices rely on intermittent wind speed and/or a secondary energy source, such as solar power, for producing power, which demands a standby conventional power generator. It is an object of the present invention to provide an airfoil and a turbine apparatus which goes at least some way toward overcoming the above problems and/or which will provide the public and/or industry with a useful alternative.

Further aspects of the present invention will become apparent form the ensuing description which is given by way of example only.

According to the invention, there is provided a turbine airfoil for relative movement in an ambient fluid, comprising:
  a main spar having a cross-sectional shape of an airfoil with a top side wall and a bottom side wall, a leading edge, a trailing edge, and a camber line extending from the leading edge to the trailing edge, the movement of the airfoil relative to the ambient fluid such that the ambient fluid flows over the main spar in a downstream direction from the leading edge to the trailing edge, and
  discharge means operable to discharge fluid outwardly into the ambient fluid flowing over the main spar;
  characterised in that a side wall of the main spar comprises sequentially from the leading edge to the trailing edge a first hill formation and a second hill formation, each hill formation comprising a first region of progressively increasing distance from the camber line, a second region of progressively decreasing distance from the camber line, and a crest at an interface between the first and second regions,
  whereby, the first region of the first hill formation is operable to interact with the ambient fluid to accelerate it from a high subsonic relative speed to a sonic relative speed over the crest of the first hill formation and supersonic speed after the crest of the first hill formation;
  the discharge means discharges an evaporative fluid to evaporate into the ambient fluid before condensation onset in the second region of the first hill formation, said second region of the first hill formation interacts with the ambient fluid to accelerate the ambient fluid from supersonic relative speed to higher supersonic relative speed;
  the first region of the second hill formation is operable to interact with the ambient fluid to decelerate and maintain the ambient fluid at supersonic relative speed over the crest of the second hill formation, and
  the discharge means is further operable to discharge a condensing fluid to capture or nucleate condensation shock in the ambient fluid flowing over the second region of the second hill formation which decelerate the ambient fluid from supersonic relative speed to subsonic relative speed and generate a pressure on the side wall and thereby impart thrust on the air foil.

The present invention provides an airfoil for producing work and power directly from the moisture in the air. It has no dependence on wind speed and its energy source is directly derived from the always available ambient atmosphere. Furthermore, the condensed moisture is a bountiful water source and in use, allows for refrigeration, air conditioning and cryogenic superconducting. Finally, the residual heat can be used for immediate local requirements.

The characteristic design of the airfoil provides two hill formations mounted along its length. The first of these hill formations accelerates the flow of the ambient fluid until it reaches the speed of sound. After the first hill formation the Mach number continues to increase supersonically as the area increases. The evaporative fluid, such as a spray of water droplets, is discharged into the ambient either along the descent or at the bottom of the first hill formation. These evaporate causing the air to cool. This in turn accelerates the ambient flow further and decreases the pressure. On the second hill formation the lower pressure causes a thrust. As the flow moves relative to the second hill formation the Mach number decreases along the first region and then increases as it descends along the second region. At a point along this second hill formation the Mach number reaches the condensation Mach number. At or before this point, a condensing fluid is discharged causing the water content of the air to condense releasing heat. This will cause a decrease in Mach number and an increase in pressure. The increased pressure on the second region of the second hill will produce a thrust which can be used to turn a rotor.

The present invention is concerned with an airfoil and turbine apparatus that is operable to control condensation and evaporation of ambient air to allow the heat released to be harnessed to produce work. The present invention is therefore not restricted by the above limitations of the prior art and provides a primary renewable energy and water capturing device.

In another embodiment of the invention, the evaporating fluid is discharged before an incipient condensation shock preventing/compensating for it in the ambient fluid flowing over the first hill formation In another embodiment of the invention, the condensing fluid is discharged before condensation shock occurs in the ambient fluid flowing over the second hill formation.

In another embodiment of the invention, the discharge means comprises at least one nozzle, and the evaporative fluid and condensing fluid is conveyed from a supply to the or each nozzle via an arrangement of conduits in the airfoil. Variable pinhole size for the nozzle or nozzles will allow variable flow rate and droplet size of the discharged fluid.

In another embodiment of the invention, the main spar comprises a hollow cavity containing a working fluid, whereby the cavity is divided into a plurality of interconnected chambers.

In another embodiment of the invention, each chamber comprises valve means operable to control the flow of the working fluid between the chambers to adjust the pressure and/or temperature of the working fluid in each chamber independently.

In another embodiment of the invention, the evaporative fluid is one or a combination of: water, liquid nitrogen and a hydrocarbon, such as methanol.

In another embodiment of the invention, the evaporative fluid comprises fluid particles that have a diameter operable to evaporate in the scale of the turbines designed size. To allow for this and other ambient environmental factors the droplet size can be varied by variable outlet size, variable flow rates and variable pressure and temperature. These conditions are determined by the ducting, chambers and variable nozzle sizes. The spinning head centrifugal force or outside pumping manages these conditions using causing the compression of gases and/or heat exchange with the outside atmosphere for temperature management.

In another embodiment of the invention, the condensing fluid comprises fluid particles that are cooled, statically charged, such as droplets of water, brine and ice particles.

In another embodiment of the invention, the ambient fluid is moist air.

In a further aspect of the invention there is provided a turbine apparatus having at least one airfoil as claimed in any one of the preceding claims, the apparatus comprising:

- a turbine shaft and at least one rotor extending axially from the shaft, whereby an airfoil is carried at the tip of each rotor,
- an arrangement of conduits within the shaft and each rotor through which the evaporative and condensing fluids are supplied to the airfoil,
- each rotor is configured to interact with the ambient fluid to rotate such that the leading edge of an airfoil moves through the ambient fluid to thereby rotate the turbine shaft.

The turbine apparatus of the present invention taps into the energy reserve created by evaporation and condensation processes to provide energy that can be converted into electricity or other usable energy forms. By doing so, the turbine apparatus will generate power from the atmosphere using the water content of the air as its energy source. When operated in a dry climate, the condensed water produced as an output may be captured and used for irrigation purposes.

The present invention thus produces work and power directly from the moisture in the air. It has no dependence on wind speed and its energy source is directly derived from the always available ambient atmosphere. The condensed moisture is a bountiful water source, and a cold core allows for refrigeration, air conditioning and cryogenic superconducting. Any residual heat can be used for immediate local requirements.

In another embodiment of the invention, the induced condensation shock is operable to condense fluid particles in the ambient fluid and the airfoil can be configured to deflect the condensed fluid into at least one collection means of the apparatus.

In another embodiment of the invention, the collection means comprises one or more of:

- channels formed in a ducting through which condensed fluid content flows into a collection chamber;
- a collection surface of a housing, netting or other surface surrounding the turbine against which condensed fluid content is deflected into a collection chamber; and
- one or more cyclone or vortex tubes and a collection chamber to collect condensed fluid content along the turbine shaft.

In another embodiment of the invention, the turbine further comprises energy conversion means to convert energy generated by the rotating turbine shaft into electrical and/or mechanical energy.

In another embodiment of the invention, the energy conversion means is provided in a housing of the turbine apparatus, and the shaft is coupled to the housing, whereby conducting windings of the energy conversion means for generating electrical energy are provided in the housing.

The present invention provides an engine capable of producing power comprising of transonic airfoils or bodies of rotation that optionally include rotors and an axial hub. The airfoils or bodies of rotation have a supersonic pocket next to a reducing cross section and at or before the minimum cross section, and in which an evaporative spray or coolant gas is introduced through a nozzle. This is tailored to reduce the pressure on the subsequent increasing cross section. At or near the maximum cross section a further spray may be introduced to nucleate subsequent condensation. After the maximum cross section the reducing cross section causes condensation shock. Liquid spray previously introduced provides nuclei to capture these ephemeral droplets. These liquids—typically water- or gases can be carried from the hub to the airfoils or bodies of rotation by the rotors with suitable interior ducting. The condensation shock terminates the supersonic pocket and returns the airflow to subsonic pressurising the back of the device.

The engine can be used to produce power, to extract axial work from the hub, to sustain the rotation of the rotors, to extract the condensed water, to avail of the very cold conditions at the tips for cryogenic and superconducting purposes or avail of the centrifugal pumping of the spinning device.

DETAILED DESCRIPTION OF THE INVENTION

The invention will be more clearly understood from the following description of some embodiments thereof, given by way of example only, with reference to the accompanying drawings, in which:

FIG. 1 is a perspective view of an airfoil according to the invention;

FIG. 2 is an end view of the airfoil of FIG. 1;

FIG. 2*a* is a diagrammatic of the body of rotation of the airfoil of FIGS. 1 and 2;

FIG. 3 is a diagrammatic side view of the airfoil of FIG. 1;

FIG. 4 is a perspective view of a turbine comprising the airfoil according to FIGS. 1 to 3;

FIG. 5 is a detailed perspective view of a cutaway portion of the turbine of FIG. 4;

FIG. 6 is a perspective view of a water collection device embodying the turbine of FIG. 3;

FIGS. 7*a* to 7*c* are perspective views showing water flow in the turbine apparatus of FIG. 3;

FIG. 8 is a graph showing contours of Mach number in a stable scenario with supersonic flow throughout a central section of the airfoil;

FIG. 12 is a table showing the post-condensation Mach number with varying temperature and humidity for 10K of cooling;

FIG. 13 is a table of the dip depth with varying temperature and humidity for 10K of cooling;

FIG. 14 is a table showing the input parameters for a thrust calculation for the turbine apparatus;

FIG. 15 is a graph showing the contours of Mach number before evaporation, is initiated;

FIG. 16 is a graph showing the contours of Mach number after evaporation, showing the region where evaporation occurs;

Figure 1:
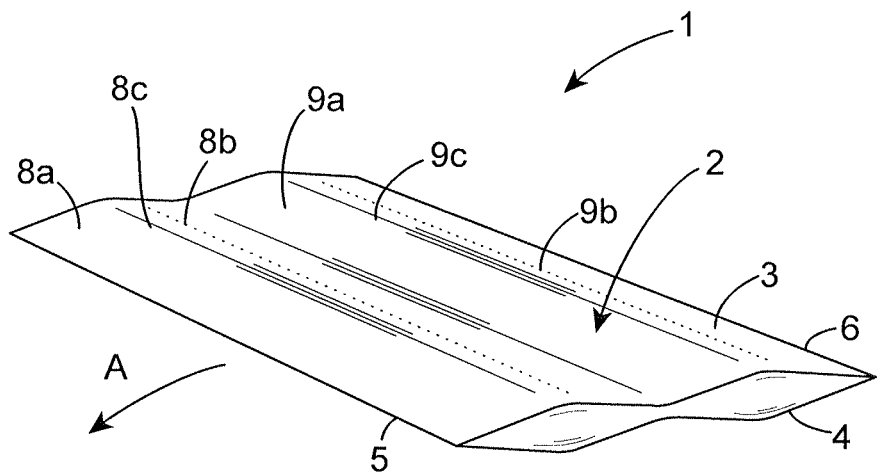
Figure 2:
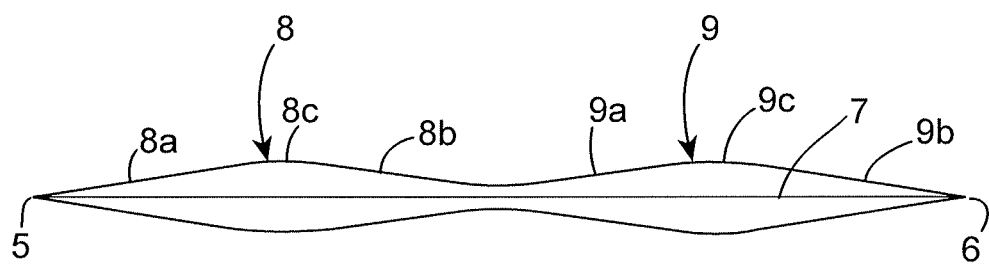

Referring to the drawings, and initially to FIGS. 1 and 2, there is shown a turbine airfoil, indicated generally by the reference numeral 1, for relative movement in an ambient fluid, such as moist air. The airfoil 1 comprises a main spar 2 having a cross-sectional shape of an airfoil with a top side wall, indicated generally by the reference numeral 3, and a bottom side wall, indicated generally by the reference numeral 4, a leading edge 5, and a trailing edge 6. A camber line 7 extends from the leading edge 5 to the trailing edge 6. As the airfoil 1 moves relative to or through the ambient fluid in the direction of arrow 'A' (FIG. 1) the ambient fluid flows over the main spar 2 in a downstream direction from the leading edge 5 to the trailing edge 6.

Figure 2A:
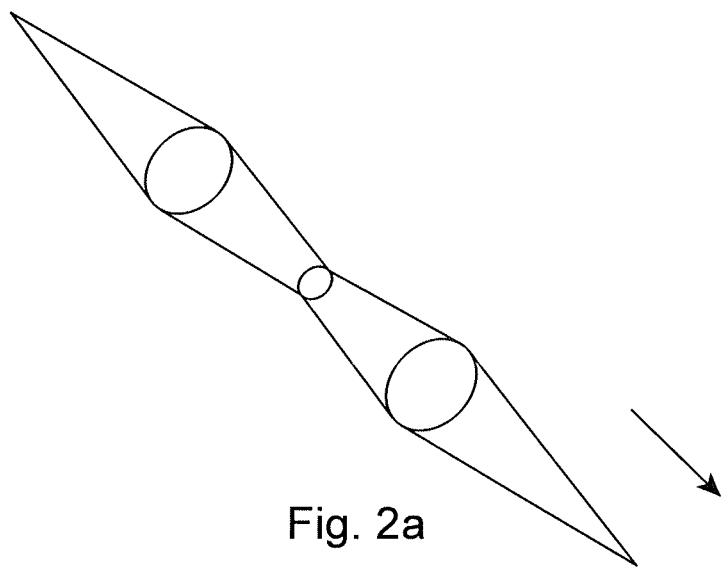

FIG. 2 is a sectional view of the airfoil, and FIG. 2a shows the body of rotation of the airfoil of FIG. 2, which in the instance shown gives an expanding and tapering cylindrical shape and is one example of an airfoil shape embodying the general design principles of the present invention. Cylindrical contours may also be applied to the tips 5, 6 of the airfoil as required or as desired, such as if a housing is not employed to manage tip end vortices.

The main spar 2 comprises sequentially from the leading edge 5 to the trailing edge 6 a first hill formation 8 and a second hill formation 9. Each hill formation 8, 9 comprising a first region 8a, 9a of progressively increasing distance from the camber line 6, a second region 8b, 9b of progressively decreasing distance from the camber line, and a crest 8c, 9c at an interface between the first regions 8a, 9a and second regions 8b, 9b. Although hill formations are shown in FIGS. 1 and 2 on both the top side wall 3 and the bottom side wall 4, it will be appreciated that hill formations may be located on the top and/or the bottom side wall of the airfoil as required or desired. Reference in the following description will be made to the hill formations being provided on the top side wall 3 only, however this should not be seen as limiting.

The main spar 2 comprises a hollow cavity containing a working fluid, whereby the cavity is divided into a plurality of interconnected chambers. Between the chambers is valve means operable to control the flow of the working fluid between the chambers so that the pressure and/or temperature of the working fluid in each chamber may be adjusted independently.

Figure 3:
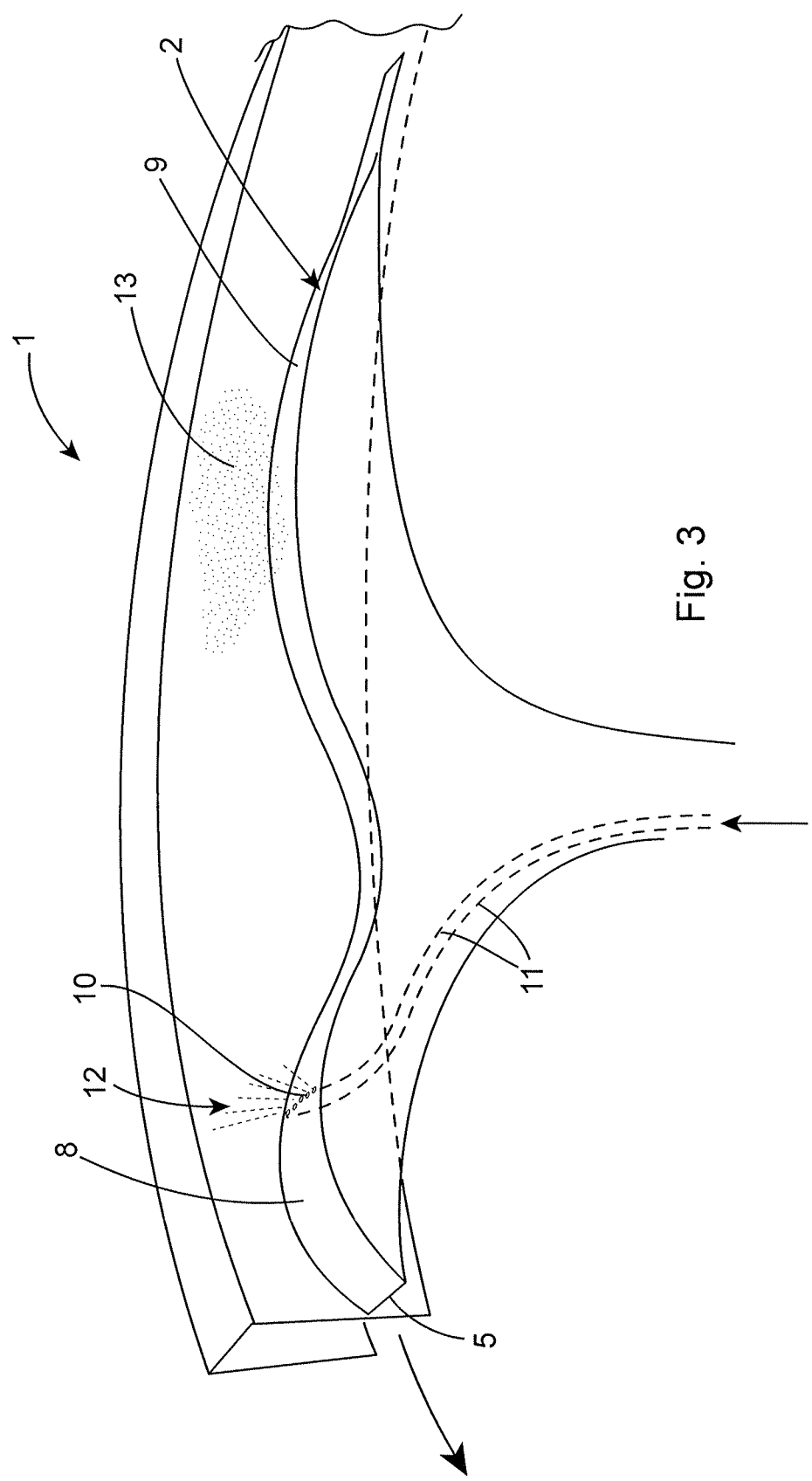

As shown in FIG. 3, the airfoil 1 further comprises discharge means, indicated generally by the reference numeral 10 operable to discharge an evaporative fluid 12 or a condensing fluid 13 from the main spar 2 outwardly into the moist air flowing over the main spar 2. The discharge means comprises at least one nozzle (not shown) and the fluid discharged from the airfoil 1 is conveyed from a supply to each nozzle via a conduit or arrangement of conduits 11 within or arranged along the main spar 2 of the airfoil 1.

The evaporative fluid 12 is one or a combination of: water, liquid nitrogen and a hydrocarbon, such as methanol, and comprises fluid particles that have a diameter operable to evaporate according to the size and scale of a turbine using the airfoil. To allow for this and other ambient environmental factors the droplet size can be varied by variable outlet size, variable flow rates and variable pressure and temperature.

The condensing fluid 13 comprises fluid particles that are cooled and statically charged. Examples of suitable condensing fluids include droplets of water, brine or ice particles.

When the airfoil is moving relative to an ambient fluid the first region 8*a* of the first hill formation 8 is operable to interact with the ambient fluid to accelerate the ambient fluid from a high subsonic relative speed to a sonic relative speed over the crest 8*c* of the first hill formation 8.

The discharge means 10 then discharges the evaporative fluid 12 to evaporate into the ambient fluid before condensation onset in the second region 8*b* of the first hill formation 8 such that the second region 8*b* of the first hill formation 8 interacts with the ambient fluid to accelerate the ambient fluid from low supersonic relative speed to high supersonic relative speed. The evaporative spray is thus discharged before an incipient condensation shock occurs in the ambient fluid flowing over the first hill formation 8.

The first region 9*a* of the second hill formation 9 is operable to interact with the ambient fluid to decelerate and maintain the ambient fluid at supersonic relative speed over the crest 9*c* of the second hill formation 9, and the discharge means 10 is further operable to discharge the condensing fluid 13 to capture or nucleate condensation shock in the ambient fluid flowing over the second region 9*b* of the second hill formation 9. The condensing fluid or spray is thus discharged before condensation shock occurs in the ambient fluid flowing over the second hill formation 9. This has the effect of decelerating the ambient fluid from supersonic relative speed to subsonic relative speed which in turn generates pressure on the main spar 2 and thereby imparts a thrust on the air foil 1.

With reference to FIGS. 4 and 5, and using the same reference numerals used in FIGS. 1 to 3, shown is a turbine apparatus, indicated generally by the reference numeral 20, comprising at least one airfoil 1 configured according to FIGS. 1 to 3.

The apparatus 20 comprises a turbine shaft 21 and at least one rotor 22 extending axially from the shaft 21, whereby an airfoil 1 of FIGS. 1 to 3 is carried at the tip or end, indicated generally by the reference numeral 23, of each rotor 22. Also provided is an arrangement of conduits within the shaft 21 and each rotor 22 through which the evaporative and condensing fluids are supplied to the conduits 11 of the airfoil 1.

In use the turbine apparatus 20 is configured such that each rotor 22 interacts with the ambient fluid to rotate such that the leading edge 5 of each airfoil 1 moves through the ambient fluid to thereby rotate the turbine shaft 21.

In operation, as the airfoil 1 moves relative to the ambient fluid the induced condensation shock at or adjacent the second hill formation 9 is operable to condense fluid particles in the ambient fluid and the airfoil 1 is configured to deflect the condensed fluid into at least one collection means of the turbine apparatus 20. In one embodiment, one or more cyclone or vortex tubes and a collection chamber may be provided to collect condensed fluid content along the turbine shaft 21. In an alternative embodiment, the collection means comprises channels formed in a ducting 24 through which condensed fluid content flows into a collection chamber.

Figure 4:
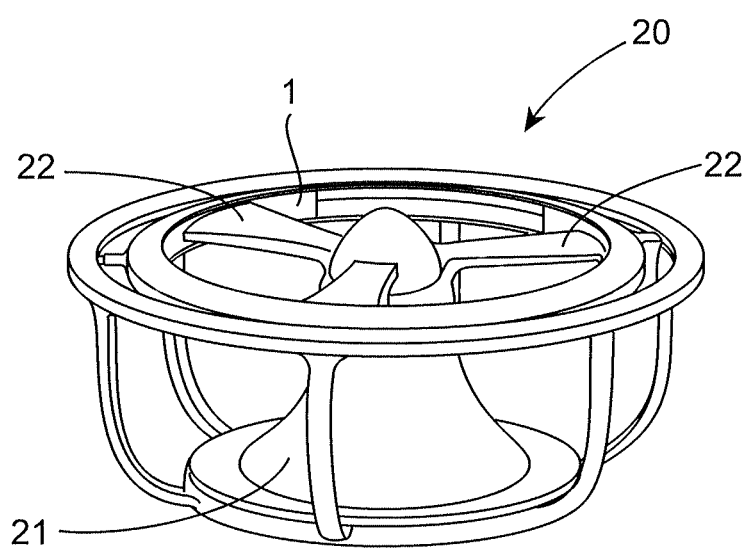
Figure 5:
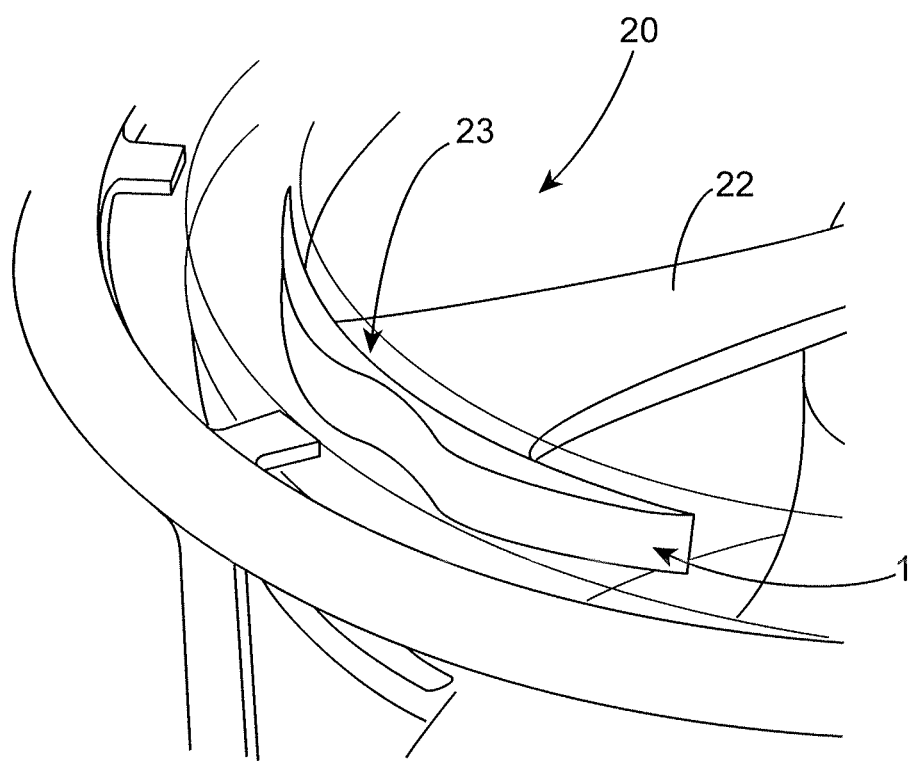
Figure 6:
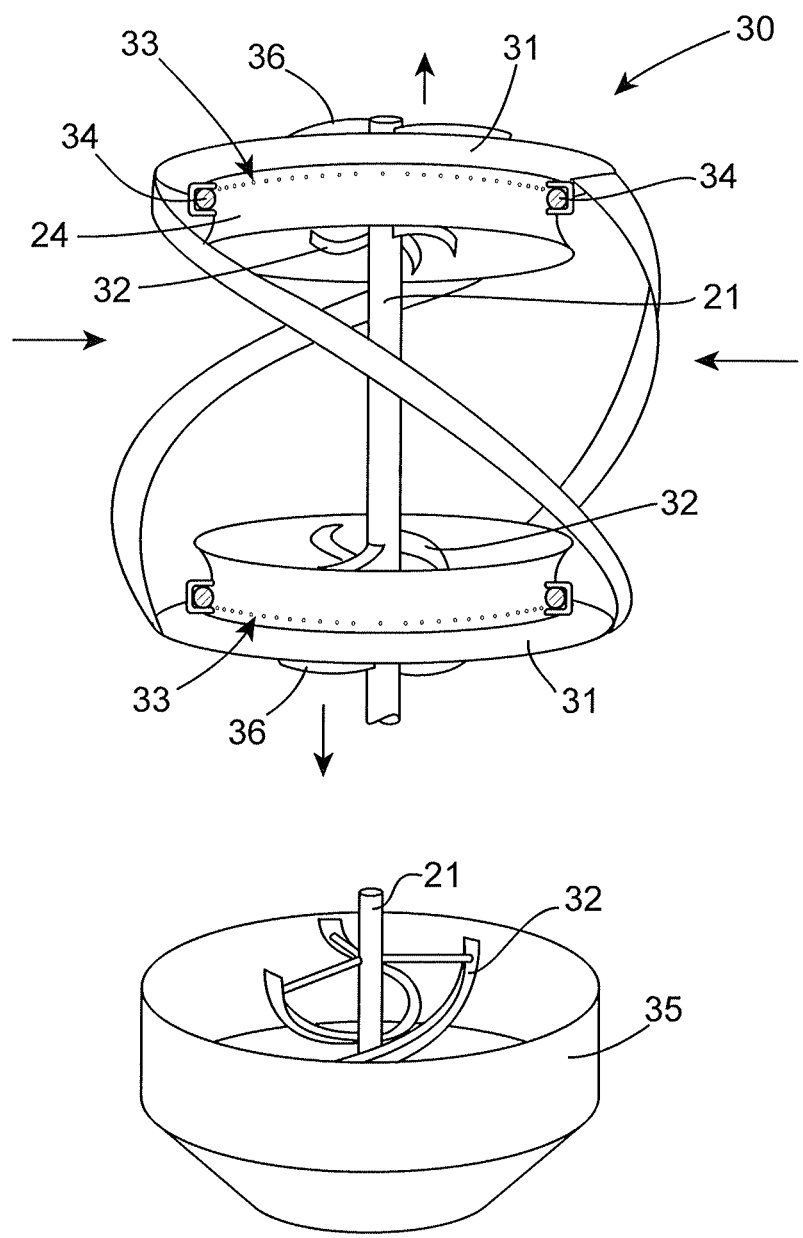

FIG. 6 shows a water collection device 30, comprising the turbine apparatus 20 of FIGS. 4 and 5, and embodying a further water collection means. The water collection device 30 is operable to create a cylinder of rotating air blowing out from the centre of the device or in towards the centre. The water collection device 30 comprises a venturi tube 31 at both ends of the shaft 21, a set of stators 32 before the throat of each venture tube 31 operable to induce rotation in the high speed low pressure fluid droplet airflow entering the stators 32. A collection ring of pinholes 33 is provided along the ducting 24 and are backed by a low pressure chamber 34 which drains to a collection tank 35. A further set of stators 36 are provided after the throat and pinholes 33 which are operable to reduce rotation and recover airflow energy and pressure. The collection tank 35 surrounds the out-going airflow which contains droplets of water, and the surface of the tank 35 is operable to collect impinging droplets which collect in the tank 35.

The turbine apparatus 20 also comprises energy conversion means to convert energy generated by the rotating turbine shaft 21 into electrical and/or mechanical energy. Optionally, the energy conversion means is provided in a housing of the turbine apparatus 20, and the shaft 21 is coupled to the housing, whereby conducting windings of the energy conversion means for generating electrical energy are provided in the housing.

Figure 19:
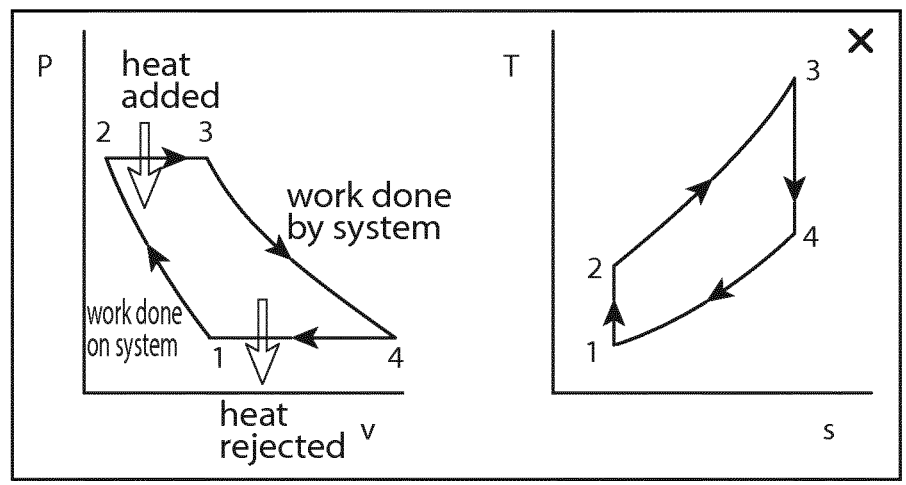
FIG. 19 is a graph showing the work cycle for the Brayton cycle.

The work cycle for the present invention will be described with reference to FIG. 19, which shows the work cycle for the Brayton cycle, of which the turbine apparatus of the present invention uses a variation. The turbine apparatus of the present invention seeks to reduce the lowest temperature (3-4). Normally this is restricted by the rejection temperature being the ambient air. In this machine the rejection temperature can be as much as minus 60 or 70 degrees centigrade. The static temperature reduction (3-4) is aerodynamic caused by isentropic increase in velocity. The rejection heat (4-1) is affected by evaporation. Temperature increase (1-2) is aerodynamic caused by near isentropic decrease in velocity. Heat added (2-3) is provided by condensation or burning hydrocarbons. Note the balance between evaporation and condensation is well illustrated and can be calculated with this cycle. In reality the flow of evaporation is the easiest to control to balance the condensation. This means the quantity of flow and the size of the droplets will need to be managed by a valve and variable pinhole arrangement.

The proposed turbine system is a rotor mounted on a vertical axis. The actual turbines are located at the tips of the rotors and the device operates in a similar principle to a tip jet such as the Fairey Rotodyne helicopter. The propulsion from the turbine creates a thrust which pushes the rotor in a circle. Unlike helicopters, the objective is not to use the motion to generate a lift force, but rather to generate electrical power.

Figure 7A:
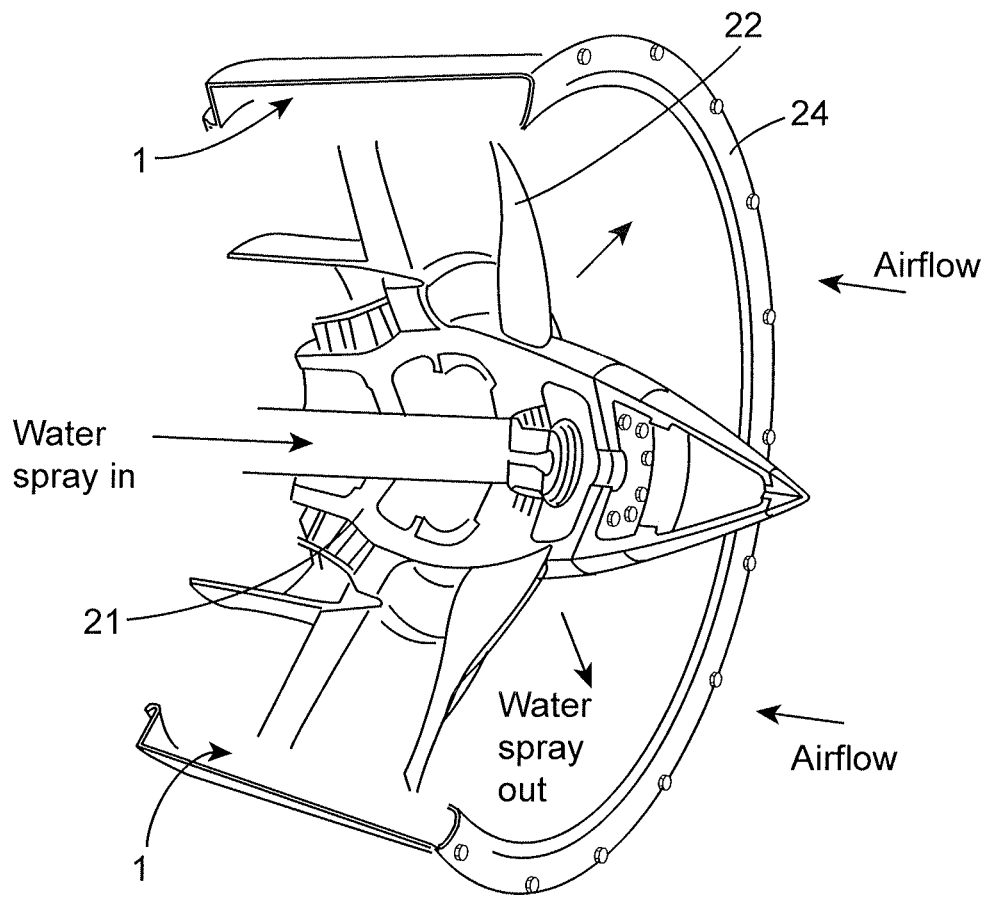
Figure 7B:
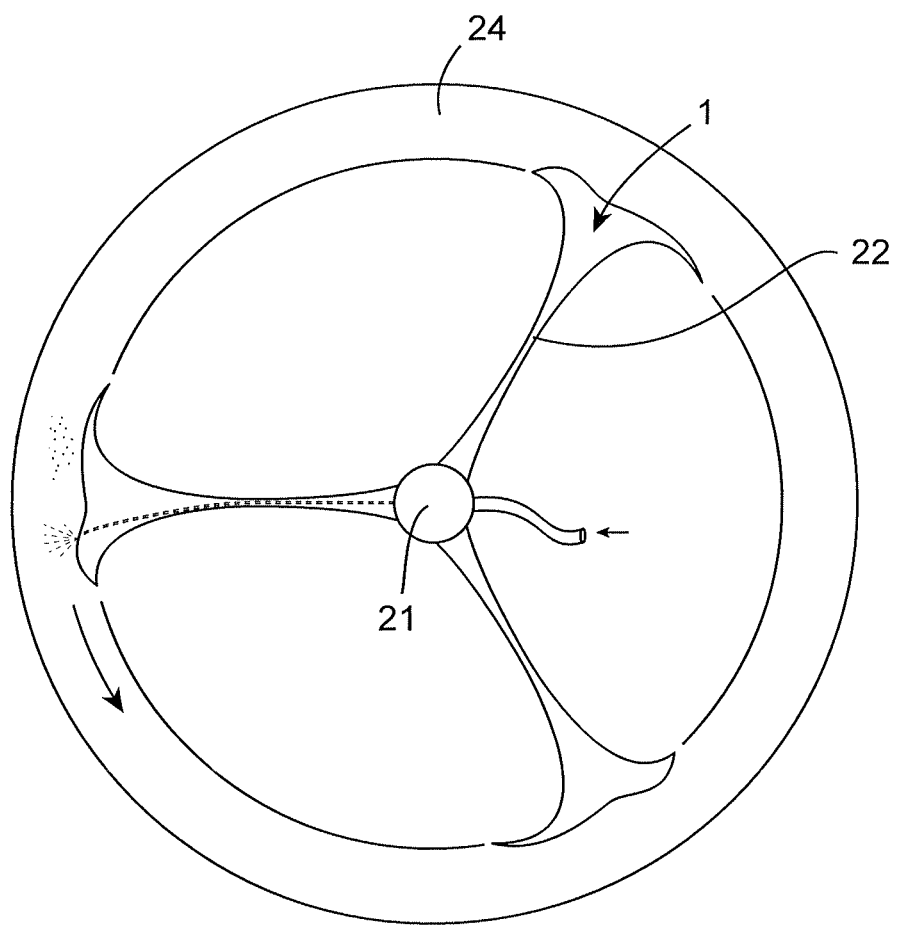
Figure 7C:
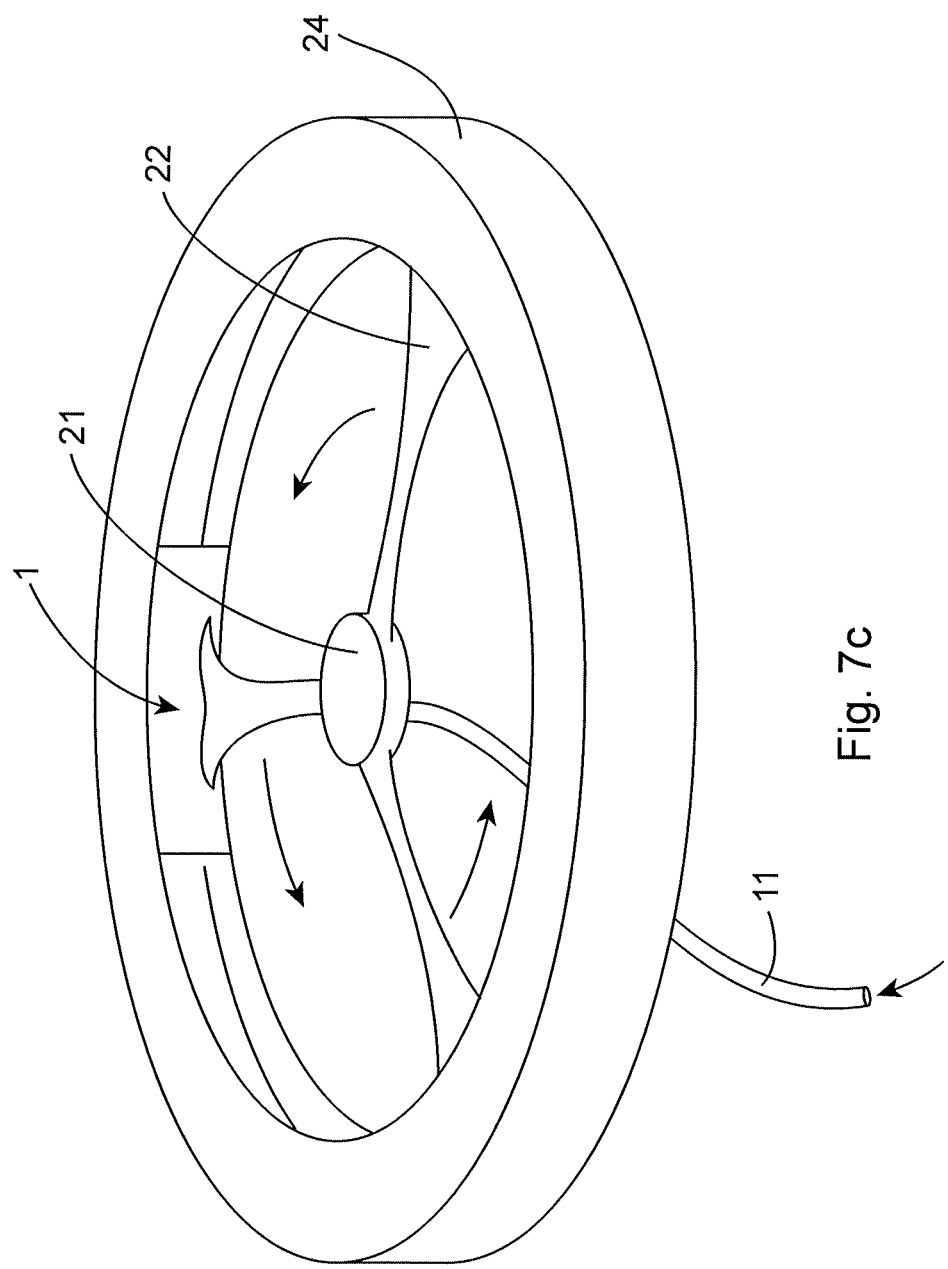

In the ducted design, shown in FIGS. 4 to 6, the transonic tips are mounted within a suspended duct. Water spray is channeled up the central shaft and down the rotors to the tips where it is added to the air. Air is pulled down through the device and removes the water spray from the device, as shown in FIG. 7.

Supersonic flow occurs when a fluid starts to move at a velocity greater than its wave speed. The most obvious application of this type of flow is in the design of military aircraft which are routinely required to 'break' the sound barrier. As the fluid is moving faster than it's wave speed information cannot be passed upstream about potential obstacles. As a result supersonic flow is significantly different from subsonic flows which are more common in everyday scenarios.

The main governing equations in the supersonic regime are the isentropic flow equations. These equations relate the pressure, temperature, density and area changes observed to the Mach number of the flow.

These equations are:

Mach Number: $M = \dfrac{V}{\sqrt{\gamma RT}}$  Equation 1

Pressure: $\dfrac{p}{p_0} = \left(1 + \dfrac{\gamma-1}{2}M^2\right)^{\frac{-\gamma}{\gamma-1}}$  Equation 2

Temperature: $\dfrac{T}{T_0} = \left(1 + \dfrac{\gamma-1}{2}M^2\right)^{-1}$  Equation 3

Area: $\dfrac{A}{A^*} = \left(\dfrac{\gamma+1}{2}\right)^{-\left(\frac{\gamma+1}{2(\gamma-1)}\right)} \times \dfrac{\left(1 + \dfrac{\gamma-1}{2}M^2\right)^{\left(\frac{\gamma+1}{2(\gamma-1)}\right)}}{M}$  Equation 4

Symbols
M=Mach number, V=Velocity, R=Gas Constant, T=Temperature, P=Pressure
A=Area, γ=Ratio of Specific Heats, ρ=Density, φ=Relative Humidity, Y=Throat X=Longitudinal Distance
Subscripts/Superscripts
0=Stagnation Property, *=Choked Property These equations show that as the Mach number of a flow increases the static pressures and temperatures will drop. The stagnation properties will remain the same so long as there is no heat transfer. The area will also see an increase as the Mach number increases away from unity in the supersonic regime, but will also see an increase as it moves from unity in the subsonic regime as well.

The process of condensation in the atmosphere is dependent on the temperature of the air and the vapour content. For any given temperature, the air pressure can be calculated from $P = \rho RT$  Equation 5 where p is the density, R is the gas constant of air and T is the temperature in Kelvin.

Air consists of a certain amount of water vapour and one of the important terms for condensation is partial pressure of this vapour. The partial pressure is the air pressure multiplied by the relative humidity. The other important term is the saturation pressure. This is the pressure at which water will condense and can be determined from the equation $P = 133.322 e^{(20.386 - 5132/T)}$ If the partial pressure is greater than the saturation pressure will start to condense. Similarly, if the partial pressure is less than the saturation pressure the water will evaporate.

The effects of heating on supersonic flow are complicated because the Mach number, temperature and pressure are all interdependent. One simplification is to assume that any temperature change which occurs due to either evaporation or condensation does so at a constant area. This implies that these changes are occurring almost instantaneously in the case of the condensation. Under these conditions, the effect of heating can be determined from the Rayleigh equations where each property is related to its value under choked conditions. These equations are:

$$\text{Pressure: } \frac{p}{p^*} = \frac{\gamma+1}{1+\gamma M^2} \quad \text{Equation 7}$$

$$\text{Density: } \frac{\rho}{\rho^*} = \frac{1+\gamma M^2}{(\gamma+1)M^2} \quad \text{Equation 8}$$

$$\text{Temperature: } \frac{T}{T^*} = \frac{(\gamma+1)^2 M^2}{(1+\gamma M^2)^2} \quad \text{Equation 9}$$

The effect of a temperature change can then be related to the Mach number and thus used to calculate the changes in the pressure and density of the gas.

One of the principle problems involved in designing the turbine apparatus of the present invention is that of the stability of the flow. One way in which the stability can be compromised is when the flow in the section between the two hills (the central section) becomes subsonic. If this occurs then the result will be a high pressure region on the forward facing section of the second hill. This will increase the drag of the internal structure and reduce the potential thrust of the device.

Figure 8:
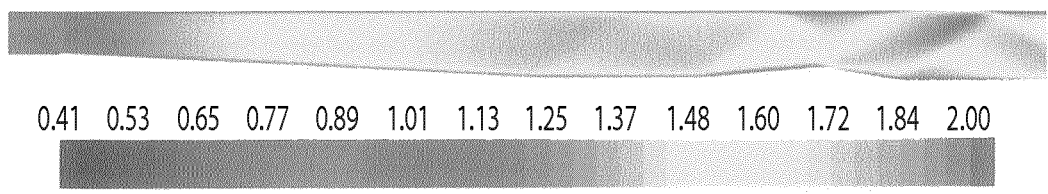
Figure 9:
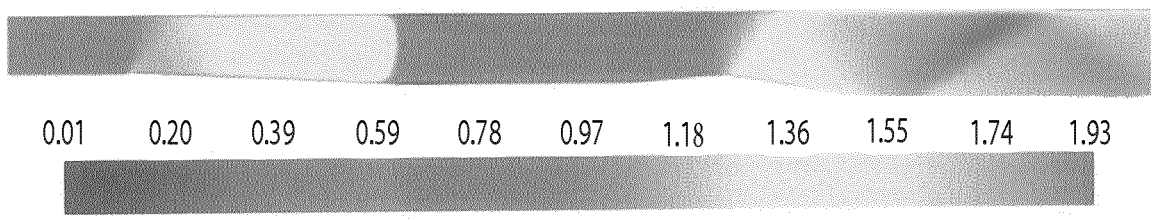
FIG. 9 is a graph showing contours of Mach number in an unstable scenario with subsonic flow through a central section of the airfoil.

FIG. 8 shows contours of Mach number in a stable scenario with supersonic flow throughout the central section. Conversely, FIG. 9 shows contours of Mach number in an unstable scenario with subsonic flow through the central section.

When considering how this section turns air flow subsonic it is useful to compare the central section to a similar case which has been well studied, being that of a rocket engine nozzle.

Figure 10:
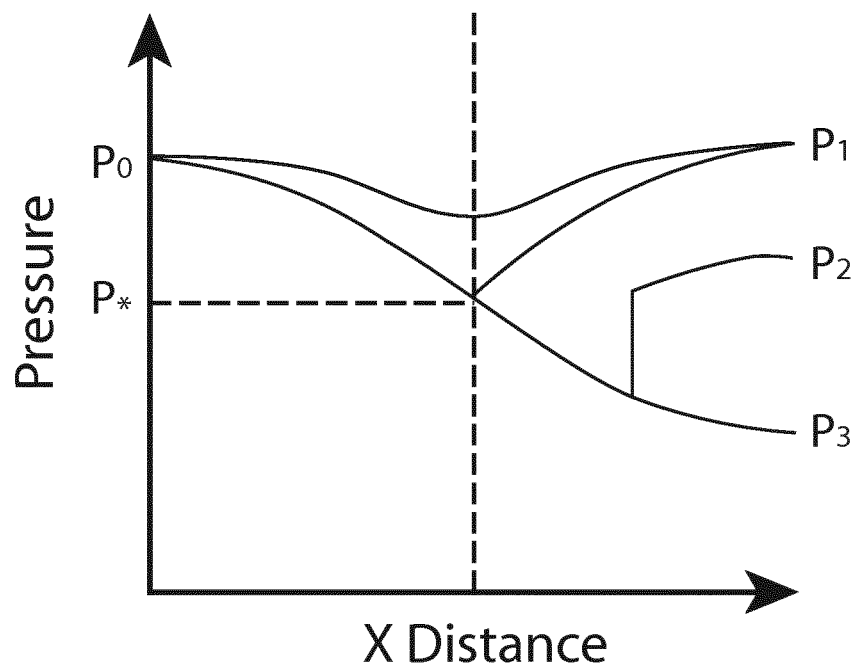
FIG. 10 is a graph showing pressure variation through a nozzle for different exit pressures.

FIG. 10 is a graph showing pressure variation through a nozzle for different exit pressures adapted from (Courant & Friedrichs, 1999). FIG. 10 illustrates the relationship between the chamber pressure and the pressure along a nozzle for different exit pressures in a rocket engine. If the pressure on the exit is close to the pressure in the chamber ($P_1$) the result will be a flow which is subsonic throughout. If the pressure on the exit then decreases to a much lower value ($P_3$) then the flow will be supersonic throughout. Problems arise when the exit pressure lies at a value between these two points. One of the phenomena which can occur at an exit pressure in this area is a normal shock at a point along the length nozzle which results in an increase in pressure during the expansion.

When airflow in the central section of the airfoil turns subsonic it is generally this type of phenomena which is observed. The flow is supersonic down the first hill formation of the airfoil but at some point down this hill a normal shock occurs resulting in subsonic flow. In FIG. 9 the shock can be seen at the end of the first hill as a rapid decrease in the Mach number and change in the contours. The key parameter in stopping this then is the pressure at the 'exit' to the first hill. For supersonic conditions to be maintained this pressure must not be too high. The 'exit' pressure considered is the increase in pressure as the flow slows to go over the second hill formation. If this second hill formation is too high, the result will be the subsonic flow observed. The minimum throat of this hill can be calculated by using a set methodology.

Calculation methodology for the throat of second hill is as follows:

1) If we consider the inlet conditions at a given Mach number, the stagnation pressure can be calculated using Equation 2.
2) Knowing the desired Mach number at the base of the hill, the area at the base of the first hill can be calculated from Equation 4.
3) The next stage is to assume a normal shock at the base of the hill and calculate the resulting Mach number.
4) From the post-shock Mach number and the area at the base of the hill, the Mach number at the choke conditions can be calculated.
5) In order to provide an operating margin, the area at a Mach number of 1.1 is then calculated from the choke conditions.

This area at a Mach number of 1.1 then represents the minimum height of the throat at the second hill. For throats larger than this, the flow will be supersonic throughout the system. If the throat is smaller than this, the central section will break down into subsonic flow. This provides one parameter of the turbine in that if the entry Mach number, the throat height at the first hill and the Mach number are known then the height of the second hill can be calculated.

One of the conditions which can hamper operation of the turbine is the occurrence of condensation within the central section of the airfoil, which is understood to be the interface between the first and second hill formations. The principle reason for this is that if a net condensation occurs in this area, the evaporation necessary to power the device will not occur if sufficient quantities. If the partial pressure of the vapour rises above the saturation pressure of the water at a given temperature then condensation will start to occur. To prevent this, the partial pressure of the vapour must remain at less than the saturation pressure.

There are two methods by which the calculation can proceed. Each method has its strengths and weaknesses.

The first method involves the similarity laws presented in G. Schnerr's paper (Schnerr, 1989) in which the Mach number where condensation occurs is related to the relative stagnation humidity by the relationship $$\Phi_0^a = \frac{\frac{\gamma+1}{2}}{1+\frac{\gamma-1}{2}M_c^2} \quad \text{Equation 10}$$

where $$a = \alpha \left[ \frac{\gamma+1}{2(\gamma-1)} - \left( \frac{d\left(\frac{T}{T_{01}}\right)}{d\left(\frac{x}{y^*}\right)} \right)^* \right]^\beta$$

and $\alpha=0.208$ and $\beta=0.59$

With the onset Mach number of condensation determined for the given relative humidity the maximum Mach in the central section can be chosen such that it is less that the condensation onset Mach number. From the chosen Mach number, the maximum depth of the device can then be calculated from Equation 4. Note that when cooling is considered here, the mach after the cooling should be considered here for the condensation onset and the resulting upstream Mach number calculated before obtaining the area. The advantage of this method is that it represents a simpler method of calculating the condensation onset, however the variables α and β are only constant for particular families of nozzle.

An alternative way is to calculate the onset Mach number from the vapour pressure. It is known that as the Mach number increases, the pressure temperature and density decrease. From the density of the air and vapour the molecular volumes of each can be calculated. From these the molecular fraction of the vapour can then also be determined The partial pressure is the product of the molecular fraction and the static pressure. If this partial pressure is greater than the saturated pressure of the vapour at a given point then condensation will occur. These values can be calculated for each Mach number and the onset Mach number determined by where the partial pressure and the saturation pressure are equal. From this the area can then be calculated as with the previous case.

The advantage of this method is that it can be calculated irrespective of the shape, however the calculations do not take account of any curvature which might alter the behaviour of the condensation onset.

Figure 11:
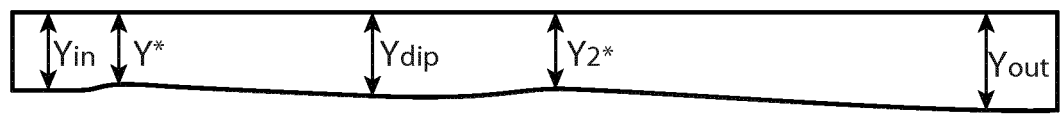
FIG. 11 is a schematic showing a geometric design for the airfoil used in the turbine of FIG. 3.

From the above calculations a method has been established for calculating the geometry of the airfoil. FIG. 11 shows the geometry of the airfoil design for a ducted scenario when one side holds the features of the hill formations whilst the other side is a flat surface. In this case the entire design can be related back to the throat diameter, y*.

Knowing y* and the inlet Mach number, calculation of yin can be performed using Equation 4. From the humidity conditions the depth $Y_{dip}$ and the Mach number in the central section can be calculated from either the similarity laws of the vapour pressure. With the Mach number, after any cooling, and the area $Y_{dip}$ the height of the second throat $y^{2*}$ can then be calculated. The exit condition $y_{out}$ then must be great enough to ensure that condensation occurs within the section as required.

From the design parameters identified previously, a set of operating conditions for the turbine can be established. In this case, the condensation onset Mach number is first calculated. If this number is below 1 then condensation will begin in the transonic regime.

This means that the condensation will start before the flow passes over the first hill. This will effectively prevent the turbine from operating.

If the condensation onset Mach number is greater than one then, considering the vapour content of the air the temperature increase can also be calculated. The temperature increase will result in a decrease in Mach number as per the Rayleigh equations. If the Mach number following the condensation is less than 1 then the flow will be subsonic from the point. If the Mach number is between 1 and 1.12 the flow will be supersonic and an expansion of the area will increase the Mach number towards 1.12. Once this point is reached, a normal shock can result in an exit Mach number of 0.9 which matches the entry Mach number. Above a Mach number of 1.12 any shock would result in a Mach number lower than 0.9 and so some form of variable geometry nozzle would be required on the exit in order to prevent the normal shock from presenting a problem.

FIG. 12 is a table showing the post-condensation Mach number with varying temperature and humidity for 10K of cooling. In this table the region indicated by the arrow B indicates where condensation would occur ahead of the first hill, the region indicated by the arrow C shows subsonic Mach numbers after condensation, the region indicated by the arrow D shows where the Mach number is less than 1.12 and the region indicated by the arrow E shows where the Mach number is above 1.12.

One of the considerations which must be noted with this table is that for many of these cases the resulting difference in height between the dip and the second hill is low enough that the second hill may be swamped by the boundary layer developing on the descent from the first hill. A table of the dip depth with varying temperature and humidity for 10K of cooling is shown in FIG. 13.

This can result in a cushioning effect where the flow becomes oblivious to the existence of the dip and a shear layer extends between the peaks of the two hills. In these cases, the Mach number will not increase as required and so would disrupt the flow. Care must be taken to ensure that this increase in height is sufficient that it will be higher than the boundary layer.

The calculation of the thrust of the turbine apparatus of the present invention is carried out using a CFD analysis of one of the turbines which shows potential. The selected turbine represents the case where temperature is 30° C. and the relative humidity is 5%. This turbine ties within the operating envelope of the device and displays a sufficient difference in height between the dip of the central section and the second throat to ensure that the boundary layer should not interfere with the flow. For this case in order to avoid condensation the calculated critical geometry details are provided in FIG. 14.

The geometry constructed was 0.5 cm thick and the initial boundary conditions applied for this simulation are:
  Inlet static pressure=101325 Pa
  Inlet stagnation temperature=352K
  Air mass flow=0.092 kg/s (18.4 kg/ms)
  Vapour mass flow=0.000118602 kg/s (0.02372 kg/ms)
  Outlet static pressure=20000 Pa Values in brackets are the mass flow rates per metre width of the device. The simulation was run with the Spairt-Allmaras turbulence model. The solution was initialised an estimate of the flow parameters. These were deliberate underestimates in order to ensure the stability of the convergence. The following settings were used in the initialisation:
  Static pressure=101325 Pa
  x velocity=283 m/s
  Temperature=303K In order for the simulation to proceed in a stable manner the flow was firstly calculated assuming zero evaporation and zero condensation until convergence of the results was reached. At this point evaporation was then added to a zone at the base of the first hill using a negative energy source. The simulation was then run again until convergence was established. At this point condensation was added as an energy source at a point suggested by the difference between the partial pressure and the saturation pressure. Again, the simulation was run until convergence was reached. The final stage involved increasing the output pressure from 20000 Pa to 100800 Pa. This moved the exit towards atmospheric conditions and moved the exit shock to occur just after the condensation in order to accurately model the behaviour on the exit from the turbine.

For a humidity of 5% at 303K the water content of the air is 1.25 g/kg. The evaporation energy extracted was equivalent to a 16K decrease in temperature or an evaporation of 2.22 g/kg whereas the energy source used for the condensation was equivalent to a 6.98K increase in temperature or a condensation of 3.47 g/kg.

Figure 17:
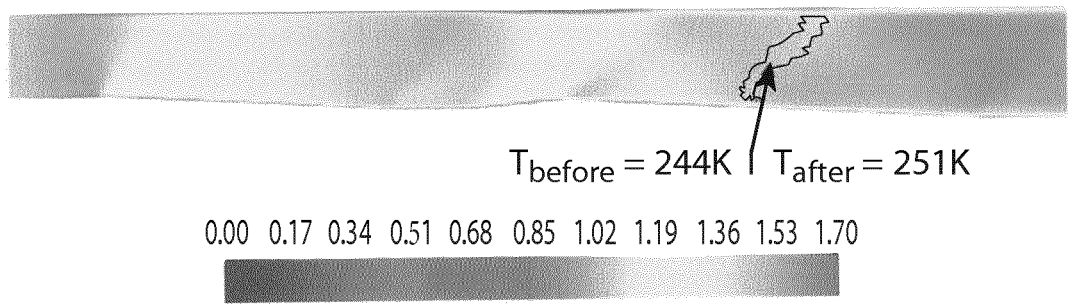
FIG. 17 is a graph showing the contours of Mach number after condensation, showing the region where condensation occurs.
Figure 18:
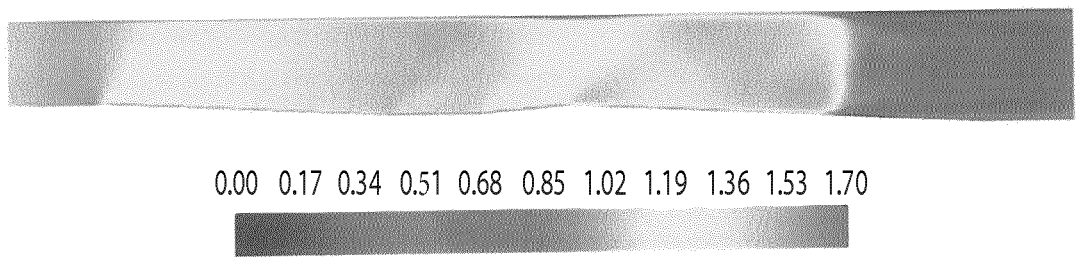
FIG. 18 is a graph showing the contours of Mach number after exit pressure is raised to atmospheric showing a shockwave after the condensation.

FIG. 15 is a graph showing the contours of Mach number before evaporation is initiated, FIG. 16 is a graph showing the contours of Mach number after evaporation, showing the region where evaporation occurs, FIG. 17 is a graph showing the contours of Mach number after condensation, showing the region where condensation occurs, and FIG. 18 is a graph showing the contours of Mach number after exit pressure is raised to atmospheric showing a shockwave after the condensation.

Once this process was completed, the resulting thrust could be established from a report of the forces over the wall surface. This report was carried out for the working area of the turbine which was defined as the interior area between the inlet and the termination shock just after the condensation. This produced a net thrust in the working area of 546N per metre of width of the turbine. This thrust includes drag effects within the working section of the turbine, but not exterior drag effects due to the rotor system ducting, the exit geometry or the difference in height between inlet and outlet. A variable geometry nozzle can then be employed to decrease the area and accelerate the flow back towards 314 m/s alternatively, the exit depth could be decreased to prevent the subsonic diffusion of the velocity. Both of these options would decrease the ram drag of the device, whilst also decreasing the thrust produced and thus a balance would have to be obtained.

In order to achieve a positive overall thrust the device must produce more internal thrust than it creates in external drag. A useful parameter to consider here is the drag coefficient. This is calculated from the equation $$C_D = \frac{D}{\frac{1}{2}\rho V^2 A}$$ Equation 11 where D is the drag on the rotor system and A is the area of the rotors. Assuming a three rotor system with a diameter of 1 m and a chord of 5 cm this produces an area of 0.075 m². The velocity used in this calculation is the average velocity which will be half the tip velocity.

Then for a rotor with a tip depth of 33 cm, and a therefore a thrust of 182N, and normal air density this means that the drag coefficient must be less than 0.14 in order for the system to produce a positive thrust. If the drag coefficient of the system can be designed down to a value of 0.04, which is common for a streamlined body, then this produces a drag of 50N. Along with bearing losses this gives a total drag of 55.1N. For a rotor with a tip depth of 33 cm this means that 30% of the available power should be set against the initial power gain.

For a moving object, power is equal to the product of the force and the velocity. For a turbine which is spinning with a tip velocity of 314 m/s this means that the total power produced on the working area of the device is 171 kW/rn (this will further reduce internally to 155 kw when variable nozzle costs are included). This is the work being produced by the evaporation/condensation cycle. The immediate losses reduce this externally to 133 kw/rn.

This work shows that, under specific conditions, the turbine will show an increase in the thrust due to the effects of the energy release from the condensation. If the external rotors/pumping can be designed in such a way as to maintain the losses to below the thrust of the device then it will produce a net thrust. Given the speed at which the device rotates, even a small increase in the thrust would produce a large increase in the available power.

During this work it has been assumed that the device will be an internal structure. This implies the existence of an exterior surface. The aerodynamic design of such a structure would be crucial to the operating of the turbine as it would have fundamental implications for the drag of the device, and hence the net power production.

The operating conditions of the device are quite sensitive. For a given humidity then higher temperatures result in more available water in the air to be condensed. This would mean the available power would be greater. As FIG. 13 shows, for any given temperature the depth to which the central section can drop is greater for higher temperatures as well. This would produce a device which is easier to manufacture. These designs are also less vulnerable to the effects of the boundary layers as the difference in height between the central section and the second hill will be greater as well.

For a given temperature an increase in the humidity would result in an increase of available power, but would also cause the condensation to occur earlier since the partial pressure will be higher. This means that the depth to which the central section would drop would decrease and the device would be more vulnerable to the boundary layer effects destabilising the flow. By reducing the amount of coolant used, the temperature drop will be decreased and as a consequence the saturation pressure would be increased. By correctly balancing the amount of coolant used to the humidity the operating range of a given physical design could be extended.

For the purposes of this analysis the device is designed to operate in conditions where the atmospheric temperature is high and relative humidity levels are low. An increase in the humidity can be somewhat countered by decreasing the cooling used in order to maintain the flow stability. These conditions would suggest that the device is more easily analysed in warm, arid climate conditions. This abundance of humidity could be managed by using a 'dry' coolant and allowing extra condensation to occur on the rear slope of the first hill. In arid places, the condensation produced as a by-product of the device would also be quite valuable and so this increases the value of the device as a whole.

It is worth noting that for a given set of conditions, the critical geometry can be found from a purely mathematical method. In order to investigate the effects of boundary layer and to evaluate the thrust, CFD presents the best available method.

The combination of these approaches has shown that there exists an operational envelope for the turbine. This range is described by a combination of the temperature, relative humidity and amount of cooling employed in the device. If for a fixed temperature and cooling, if the humidity is too high then condensation will occur before the flow becomes choked disrupting the entire process. Inside the turbine itself, these factors can influence the design of the device, but varying the amount of cooling can compensate for some variations in the other factors. Using a 'dry' coolant such as nitrogen instead of water will extend the operating range as such a coolant could be evaporated when water is condensing between the hills.

When the device is operated within its envelope and the drag on the external features are minimised then the device will generate a positive thrust. At the speeds at which the device rotates, even small increases in the thrust can create a sizable amount of power.

The design produced from the CFD calculations is a three rotor system with a diameter of 1 m. The tips have a depth of 33 cm and the system rotates at 6000 rpm. It is designed to operate in desert conditions of 5% relative humidity and 30° C. This device will produce 133 kW of power and produces 81 litres per hour (1944 litres per day) of water. Since the 'fuel' for this device is humid fresh air it produces no $CO_2$ and has no supply costs. Finally, the device can be turned on and off as required as long there is sufficient humidity in the air.

Various embodiments disclosed herein have the same common source of energy, however requirements for power, water, heat, cryogenics, spot cooling/heating or pumping will vary exact materials and scale specifications. Along with this the general environment in which the machine must operate will also dictate material and scale. Those persons skilled in the art will recognise the common requirement of smooth and rigid surfaces to operate effectively at high subsonic speeds.

These designs are resistant to high speed winds and have no obvious vulnerabilities to earthquake, tsunami and other natural disasters. Indeed localised significant fire can be managed with copious supply of water and pumping ability drawn directly from the air.

The present invention does have limitations in how cold and dry the ambient air can be for viable energy extraction. Typically more than a gram of water vapour per kilogram of air will be required. This means that temperatures will have to be above −20° C. If there is even a possibility of a vital utility failing, an alternative method needs to be relied on. Hence where this design evaporates liquid it will normally be water but can be a hydrocarbon-methanol say—which has a comparable latent heat of evaporation. Where this design adds heat due to the latent heat of condensation it can be the chemical heat of combustion of said hydrocarbon air mixture.

This will of course dictate material, pumping and spray specifications and in addition an ignition system. The possibility of this requirement may dictate features of design even if they are never used in practice. However this means that no backup plant will be required when specifying these utilities. Burning Hydrocarbons under these circumstances has a zero impact on the environment as the fuels would be synthesised with the excess power available in warmer more moist periods. If $CO_2+H_2O \rightarrow$ Hydrocarbons+$O_2$ are synthesised using excess power when available, then when it is burned Hydrocarbons+$O_2 \rightarrow CO_2+H_2O$ and returns some of the power originally invested. Note the net production of $CO_2$ is zero.

Thus combining one or more of the foregoing techniques for power production, water collection, direct electric power production, cryogenic/superconducting environment maintenance, pumping, heating or cooling, the specification can be detailed. The resulting flexibility provides designers with a wide choice for configuring an engine for the purpose(s) required.

Further Embodiments

Further embodiments of the present invention include:
1. A turbine airfoil substantially as herein described with reference to and/or as shown in the accompanying drawings.
2. A turbine apparatus substantially as herein described with reference to and/or as shown in the accompanying drawings.

Aspects of the present invention have been described by way of example only and it should be appreciate that additions and/or modifications may be made thereto without departing from the scope thereof as defined in the appended claims.

The invention claimed is:

1. A turbine airfoil for relative movement in an ambient fluid, comprising:
a main spar having a cross-sectional shape of an airfoil with a top side wall and a bottom side wall, a leading edge, a trailing edge, and a camber line extending from said leading edge to said trailing edge, wherein movement of said airfoil relative to said ambient fluid causes said ambient fluid to flow over said main spar in a downstream direction from said leading edge to said trailing edge, and
discharge means operable to selectively discharge an evaporative fluid and a condensing fluid into said ambient fluid;
wherein said main spar has a side wall extending from said leading edge to said trailing edge, said side wall having a first hill formation and a second hill formation, wherein both said first hill formation and said second hill formation include a first region of progressively increasing distance from said camber line, a second region of progressively decreasing distance from said camber line, and a crest at an interface between said first region and said second region, wherein said first region of said first hill formation is operable to interact with said ambient fluid to accelerate said ambient fluid from a high subsonic relative speed to a sonic relative speed over said crest of said first hill formation and a supersonic speed after said crest of said first hill formation;
wherein said discharge means is operable to discharge said evaporative fluid to evaporate into said ambient fluid before condensation onset in said second region of said first hill formation, said second region of said first hill formation interacting with said ambient fluid to accelerate said ambient fluid from a supersonic relative speed to a higher supersonic relative speed;
said first region of said second hill formation being operable to interact with said ambient fluid to decelerate and maintain said ambient fluid at said supersonic relative speed over said crest of said second hill formation, and
wherein said discharge means is further operable to discharge said condensing fluid to nucleate condensation shock in said ambient fluid flowing over said second region of said second hill formation to decelerate said ambient fluid from said supersonic relative speed to said subsonic relative speed and generate a pressure on said side wall to impart thrust on said airfoil.

2. A turbine airfoil as claimed in claim 1, in which said evaporating fluid is discharged before said condensation shock in said ambient fluid flowing over said first hill formation.

3. A turbine airfoil as claimed in claim 1, wherein said condensing fluid is discharged before said condensation shock occurs in said ambient fluid flowing over said second hill formation.

4. A turbine airfoil as claimed in claim 1, wherein said discharge means comprises at least one nozzle, and said evaporative fluid and said condensing fluid are conveyed from a supply to said at least one nozzle via an arrangement of conduits.

5. A turbine airfoil as claimed in claim 1, wherein said main spar comprises a hollow cavity containing a working fluid, whereby said cavity is divided into a plurality of interconnected chambers.

6. A turbine airfoil as claimed in claim 5, wherein said working fluid flowing into each of said plurality of interconnected chambers is controlled to selectively adjust pressure and temperature of said working fluid in each of said plurality of interconnected chambers independently.

7. A turbine airfoil as claimed in claim 1, wherein said evaporative fluid is selected from a group consisting of: water, liquid nitrogen and a hydrocarbon.

8. A turbine airfoil as claimed in claim 7, wherein said evaporative fluid comprises fluid particles that have a diameter operable to evaporate in said ambient fluid.

9. A turbine airfoil as claimed in claim 1, wherein said condensing fluid comprises fluid particles that are cooled and statically charged.

10. A turbine airfoil as claimed in claim 1, wherein said ambient fluid is air.

* * * * *